United States Patent [19]

Mitsui

[11] Patent Number: 5,075,616
[45] Date of Patent: Dec. 24, 1991

[54] ENGINE GENERATOR APPARATUS AND METHOD OF OPERATING SAME

[75] Inventor: Tsutomu Mitsui, Aichi, Japan

[73] Assignee: Aisin Seiki Kabushiki Kaisha, Kariya, Japan

[21] Appl. No.: 414,252

[22] Filed: Sep. 29, 1989

[30] Foreign Application Priority Data

Sep. 30, 1988 [JP] Japan .................................. 63-246274

[51] Int. Cl.⁵ ............................ H02J 7/14; H02P 9/04
[52] U.S. Cl. ..................................... 322/10; 290/38 R; 290/46; 322/34
[58] Field of Search ..................... 322/10, 11, 33, 34; 290/38 R, 40 C, 40 R, 46

[56] References Cited

U.S. PATENT DOCUMENTS

| | | | |
|---|---|---|---|
| 3,942,024 | 3/1976 | Ingram | 290/38 R |
| 4,219,739 | 8/1980 | Greenwell | 290/46 |
| 4,463,305 | 7/1984 | Wineland et al. | 322/10 |
| 4,684,814 | 8/1987 | Radomski | 290/46 X |
| 4,739,243 | 4/1988 | Iwatani et al. | 322/10 |

Primary Examiner—R. J. Hickey
Attorney, Agent, or Firm—Burns, Doane, Swecker & Mathis

[57] ABSTRACT

When a motor/generator is changed over from a motor mode to a generator mode, field current is minimized. In the generator mode, idling is performed until the engine temperature attains a set temperature, after which the field current is supplied. As a result, load upon an engine is lightened immediately after the engine is started and the risk of the engine stalling is eliminated.

20 Claims, 9 Drawing Sheets

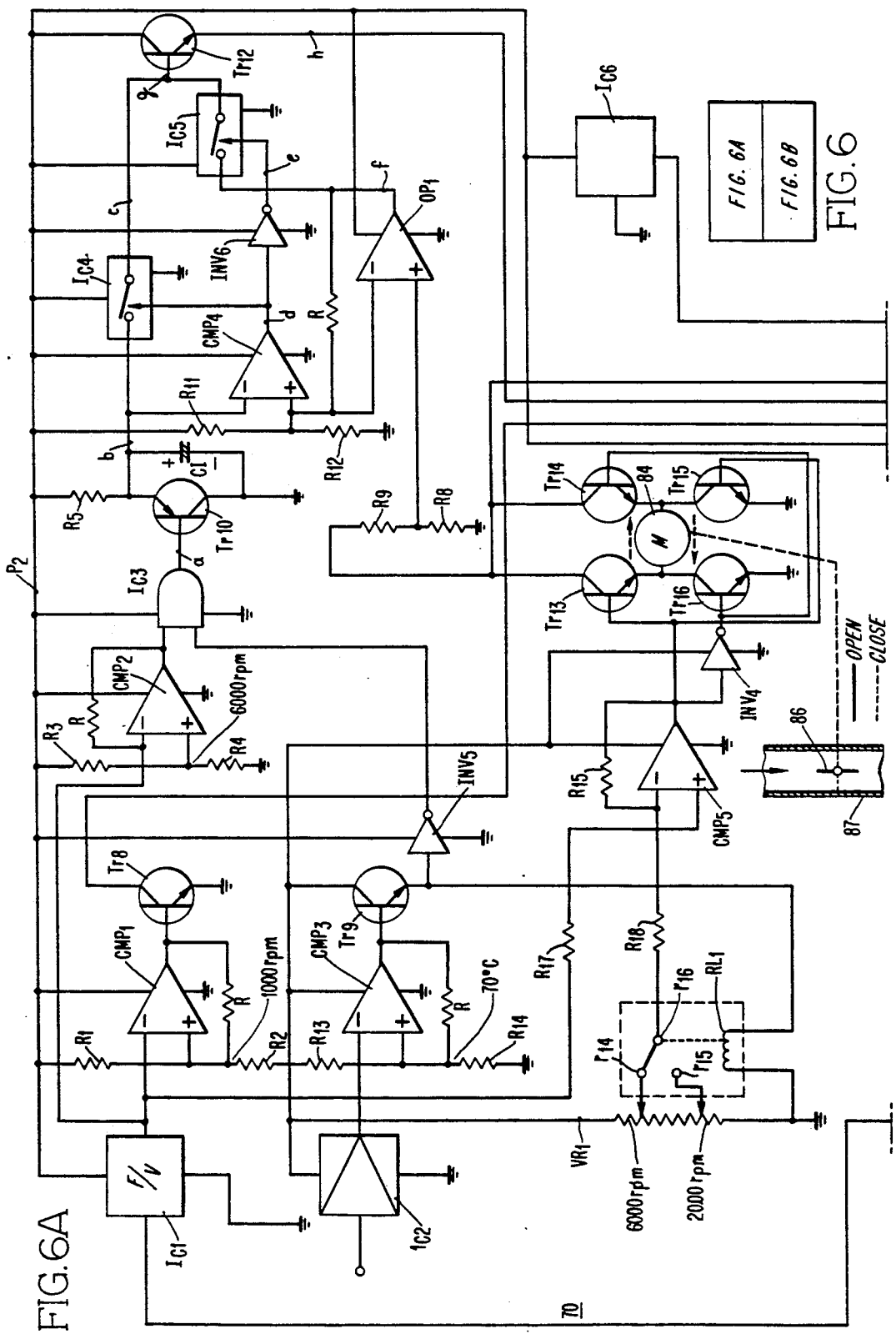

ENGINE GENERATOR APPARATUS AND METHOD OF OPERATING SAME

FIELD OF THE INVENTION

This invention relates to a generator apparatus and a method of operating the same. More particularly, the invention relates to an engine generator apparatus, a generator/starter apparatus capable of starting an engine and of generating electricity by being driven by the engine, and a method of operating the generator/starter apparatus.

BACKGROUND OF THE INVENTION

A portable (general-purpose) engine generator apparatus, which may serve as a power supply for construction work or as a temporary power source, is widely employed as a substitute for commercial power at locations where commercial power is difficult to obtain.

Such a generator apparatus basically comprises an engine which drives a generator, the generator itself, a starting device for starting the engine, and electrical circuitry. U.S. Pat. No. 4,219,739 to Greenwell et. al. (published on an Aug. 26, 1980) discloses a starter motor/alternator apparatus which serves as both a starter motor and AC generator.

In order to start the engine, the entire load of the generator is cut off and a push-button switch on a self-starting motor constituting the starting device is pressed by hand. The hand is removed from the switch after confirming, by the sound of the engine, that the engine has started. It becomes possible to introduce a load after achieving a prescribed idling operation while adjusting the throttle opening. The throttle opening continues to be adjusted while successively introducing the load and confirming the sound of the engine. The operation necessary at the time of start-up is finally completed by fully introducing the throttle opening. Ordinarily, this operation is performed by a skilled individual, such as one in charge of electrical activities, while the generator apparatus is monitored.

SUMMARY OF THE DISCLOSURE

Certain problems are encountered in the related prior art. Specifically, since there is a great shortage of skilled workers at construction sites, circumstances are such that the above-described operation is carried out even by individuals lacking in experience. In extreme cases, therefore, the starter switch may be pressed with the load left connected, or an excessive load may be introduced before the generator has a chance to stabilize, as can occur when the operator misjudges the time required for idling, which differs with a change in ambient temperature. This can cause stalling of an engine which has been started. If this is repeated, consumption of the battery will result.

Furthermore, since, the engine generator apparatus emits noise, there are cases where it is installed at a location remote from the work area. When such is the case, it is convenient if the starter switch can be provided remote from the generator. However, if the generator apparatus is started from a remote location, the sound of the engine cannot be heard directly. As a consequence, it is difficult to judge how long the starter switch should be held depressed. Moreover, whether start-up has been completed and whether a stable state has been attained cannot be verified, as a result of which problems are encountered in introducing the load.

Accordingly, an object of the present invention in one aspect thereof is to provide an engine generator apparatus by which an engine can be started without relying upon a skilled individual and without always required direct supervision of the generator apparatus.

In a case where a generator apparatus is mounted on an automotive vehicle or the like, the usual practice is to provide the generator apparatus separately of the engine starting apparatus. However, since it is required to use as little space as possible in such vehicles, there is strong demand for a more compact generator apparatus and engine starting apparatus.

Accordingly, an object of the invention in a second aspect thereof is to provide a compact generator/starter apparatus, namely a generator apparatus capable of being mounted on an automotive vehicle and made to serve also as an engine starting apparatus, whereby less space is occupied within the vehicle and there is little risk of the engine stalling when it is started.

Another object of the invention in a third aspect thereof is to provide a method of operating generator/starter apparatus capable of being mounted on an automotive vehicle, the apparatus being readily controlled without risk of the engine stalling when it is started.

In the first aspect of the present invention there is provided an engine generator apparatus having a motor/generator operated in a motor mode for starting an engine and in a generator mode to be driven by the engine, comprising first control means for minimizing field current when a changeover is made from the motor mode to the generator mode, second control means operable in the generator mode for maintaining rotational speed of the engine at a first set rotational temperature, and for outputting a signal, which increases the rotational speed of the engine to a second set rotational speed, to throttle adjusting means after the engine temperature attains the set temperature, and the motor/generator from the minimum state after the engine temperature attains the set temperature.

In the second aspect of the present invention there is provided a generator/starter apparatus having a motor/generator operated in a motor mode for starting an engine and in a generator mode to be driven by the engine, comprising first control means for minimizing field current when a changeover is made from the motor mode to the generator mode, second control means operable in the generator mode for outputting, to throttle adjusting means, a signal for maintaining rotational speed of the engine at a first set rotational speed until engine temperature attains a set temperature, and for increasing the rotational speed of the engine to a second set rotational speed after the engine temperature attains the set temperature, and third control means for increasing the field current of the motor/generator from the minimum state after the engine temperature attains the set temperature.

The overall mechanisms of the engine generator apparatus of the first aspect and the generator/starter apparatus of the second aspect are illustrated in the overall block diagram of FIG. 9.

The specification of U.S. Pat. No. 4,219,739 to Greenwell et. al. (published on an Aug. 26, 1980) discloses a starter motor/alternator apparatus which serves as both a starter motor and AC generator similar to the engine generator apparatus and generator/starter apparatus of the present invention. However, U.S. Pat.

No. 4,219,739 does not disclose the aforementioned first through third control means of the present invention.

In the third aspect of the present invention there is provided a method of operating a generator/starter apparatus having a motor/generator operated in a motor mode for starting an engine and in generator mode to be driven by the engine, comprising a first step of effecting a changeover from the motor mode to the generator mode while minimizing field current, a second step of outputting a signal for maintaining rotational step of the engine at a predetermined set rotational speed until engine temperature attains a set temperature, and a third step of increasing the field current of the motor/generator from the minimum state after engine temperature attains the set temperature.

The method of operating the generator/starter apparatus of the third aspect of the invention is illustrated in the operational flowchart of FIG. 10.

The applicant has filed a previous application (Japanese Patent Application No. 62-226955) on a generator/starter apparatus using a motor/generator. The object of this earlier invention is to obtain a compact apparatus without requiring a separate self-starting motor. The present invention seeks to improve upon this earlier invention.

In the arrangement of the present invention, field current is minimzed, and preferably reduced to zero, when the changeover is made from the motor mode to the generator mode. As a result, even if a load is accidentally connected when the engine is started, the engine itself will not be loaded and therefore will not stall. In addition, by adjusting the throttle opening so as to maintain the first set rotational speed until the engine attains the set temperature, the engine is made to idle automatically in ideal fashion without relying upon a skilled operator.

Though the field current is supplied when the engine attains the set temperature, the rotational speed of the engine is raised to the second set rotational speed before the field current is supplied or immediately after it is supplied. Completion of idling is judged based upon the increase in the rotational speed of the engine or an output voltage produced by supply of the field current.

In a preferred embodiment, the field current is supplied for the first time in the generator mode after the engine has attained the second set rotational speed and the set temperature. By adopting such an expedient, an output voltage is established so that the operator is capable of readily determining that it is possible to connect the load.

Preferably, the temperature of the engine coolant is sensed as the aforementioned engine temperature. This is particularly convenient since coolant temperature represents the average temperature of the engine. In the case of an air-cooling engine, the temperature of the outer wall of the engine is sensed directly.

In a preferred embodiment, the apparatus further comprises generated voltage detecting means. After the engine attains the second set rotational speed following starting of the engine, control of the rotational speed of the engine maintained at the second set rotational speed is performed by throttle adjusting means, and the generated voltage is adjusted by field current adjusting means and the generated voltage detecting means, whereby adjustment or rotational speed while the engine is rotating in the steady state is carried out in dependence upon the amount of fuel, which is an input quantity. This adjustment of rotational speed can also be performed based on the amount of generated power, which is an output quantity. By controlling the rotational speed of the engine using both throttle opening/closing means and field current regulating means, stable operation can be achieved. In particular, regulating the field current makes possible control at a low time constant, namely control exhibiting quick response. As a result, highly stable power can be supplied.

In the engine generator apparatus is to be portable, it is preferred that an extension starter switch and a terminal for equipment be separately provided, so that starting can be achieved from a remote location. This will make it possible to install the engine generator apparatus at a location where there is little risk of the influence of noise.

Means for changing over from the motor mode to the generator mode preferably comprise a solenoid, a disk driven by the solenoid, a movable contact held on the disk as an integral part thereof, and a fixed contact disposed at a position where the movable contact may make and break contact with it. This makes mode changeover possible through a simple structure.

Preferably, all control for achieving the foregoing operations is executed in response to commands from a programmed microcomputer. This greatly reduces the amount of additional space needed for control and make much finer control possible.

BRIEF DESCRIPTION OF THE DRAWINGS

FIGS. 1 through 7 are views representing an embodiment of a generator apparatus to the present invention, in which:

FIG. 1 is a partial sectional view illustrating the construction of a generator proper;

FIG. 2 is a detailed view showing the structure of contacts in a changeover unit;

FIG. 3 is a sectional view taken along line I—I of FIG. 1;

FIG. 4 is a sectional view taken along line II—II of FIG. 1;

FIG. 5 is a view showing the right side of the generator of FIG. 1;

FIGS. 6, 6A and 6B is an electrical circuit diagram; and

FIG. 7 is a flowchart of operation;

DESCRIPTION OF THE PREFERRED EMBODIMENT

An embodiment of the present invention will now be described with reference to the drawings.

Figure 1:
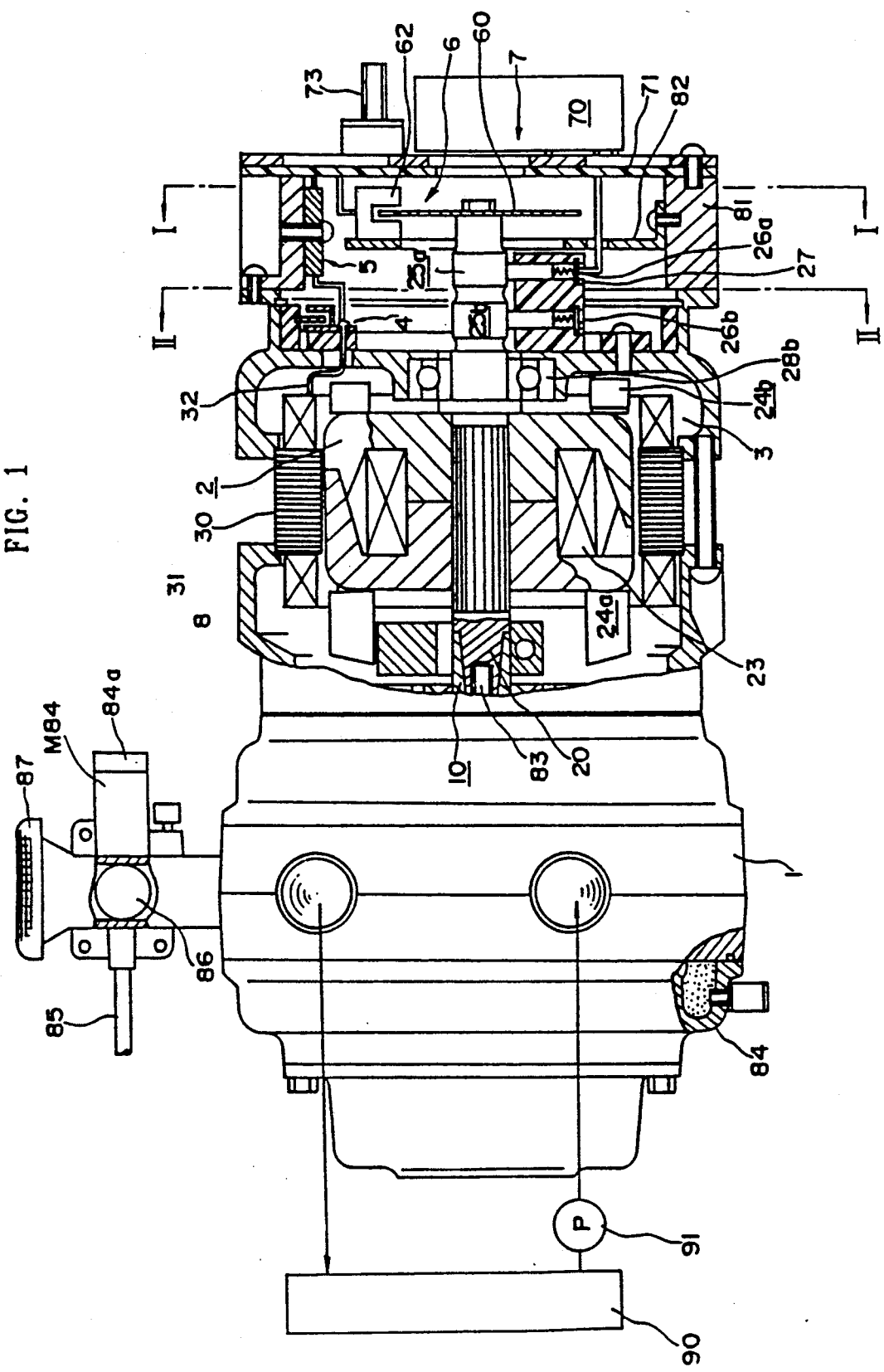

FIG. 1 is a partial sectional view illustrating an engine and a motor/generator which are the main constituents of the present invention. The engine, designated at numeral 1, is coupled to a rotor 2 of a synchronous machine via a crankshaft 10 and a rotary shaft 20. The crankshaft 10 and rotary shaft 20 are connected by a screw 83 via tapered portions. A rotor 2 is composed of a rotor core 22 and a rotor coil 23 which generates a magnetic field. Connected to the rotor coil 23 via brushes 26a, 26b and slip rings 25a, 25b is comparator control means, not shown, serving as means for regulating field current. A stator 3, which comprises a stator core 30 and a stator coil 31 in the form of a three-phase coil disposed in a core groove, is connected to the outside via a group of lead wires 32.

Figure 6B:
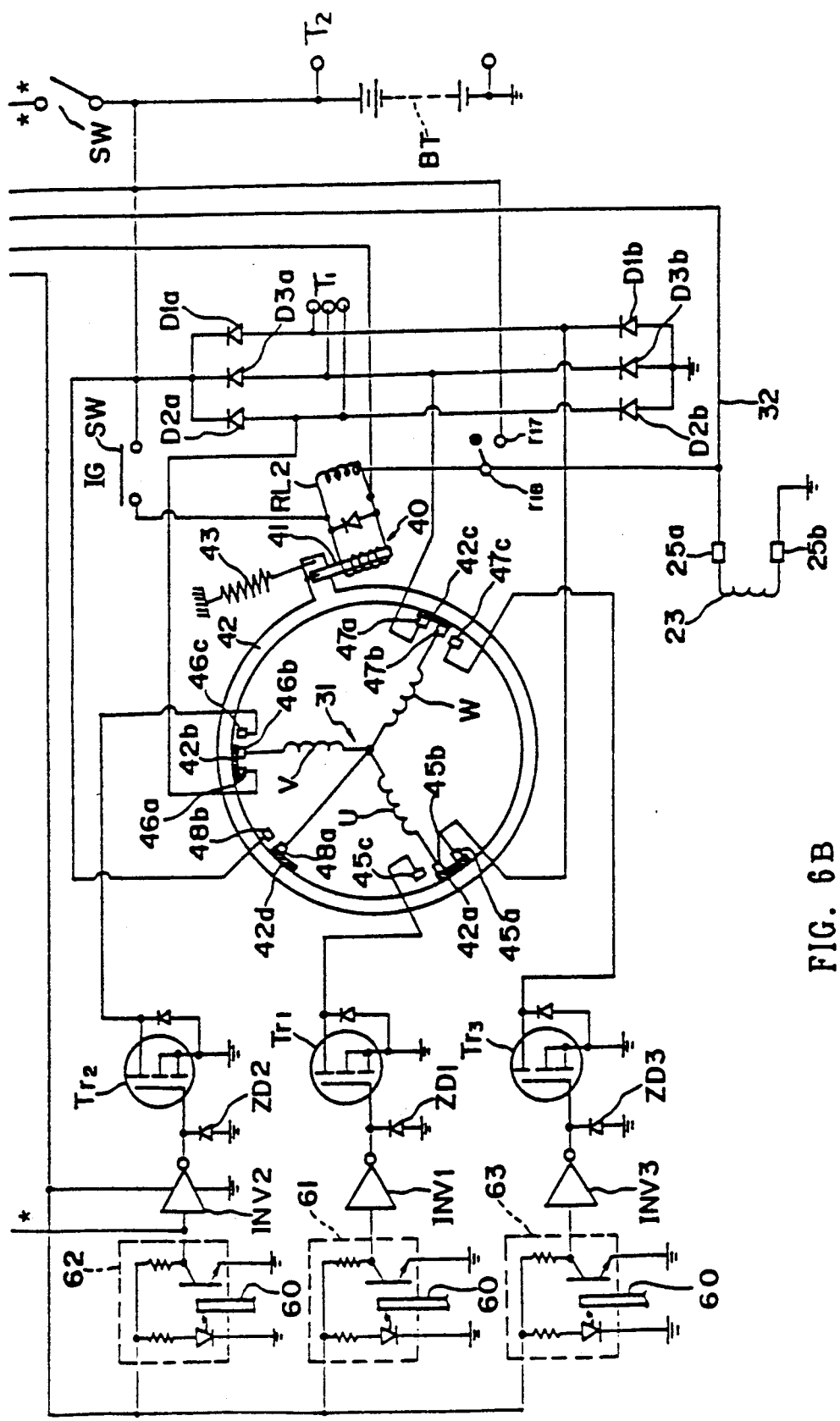

A changeover unit (mode changeover means) 4, which is for effecting a changeover between a generator mode and a motor mode, is connected to terminal ends of U, V and W phases constituting the stator coil 31, as shown schematically in FIG. 6.

The changeover unit 4 comprises four changeover switches, one for each of the U, V and W phases and one for a neutral point, and a mechanism for changing over these switches. In order to describe the changeover unit 4, reference will be had also to FIG. 4, which is a sectional view along line II—II of FIG. 1.

The changeover switch for the U phase comprises fixed contacts 45a, 45b and 45c and a movable contact 42a, the changeover switch for the V phase comprises fixed contacts 46a, 46b and 46c and a movable contact 42b, the changeover switch for the W phase comprises fixed contacts 47a, 47b and 47c and a movable contact 42c, and the changeover switch for the neutral point comprises fixed contacts 48a, 48b and 48c and a movable contact 42d.

The lead wires of the U, V and W phases and the lead wire of the neutral point are soldered to the fixed contacts 45b, 46b, 47b and 48a, respectively.

Each fixed contact is secured on an insulator plate 49 affixed to a housing 8, and each movable contact is secured to an insulator ring 42 mounted on a cylindrical portion of the housing 8 so as to be capable of turning freely.

The insulator ring 42 has an arm projecting outwardly from a cut-out formed in the housing 8 to limit the range over which the ring can be turned. Numeral 44 denotes a C-ring which prevents the insulator ring 42 from falling off.

A plunger 41 and one end of a tension coil spring 43 are fastened to a distal and portion of the arm of insulator ring 42. The other end of the tension coil spring 43 is fastened to a projection formed on the housing 8. Thus, the insulator ring 42 is subjected to a turning force acting to turn the ring 42 in the counterclockwise direction in FIG. 4. The solenoid 40 is fixed to the housing 8. When the solenoid 40 is energized, the insulator ring 42 is rotated clockwise in FIG. 6 against the force of the spring 43.

Figure 2:
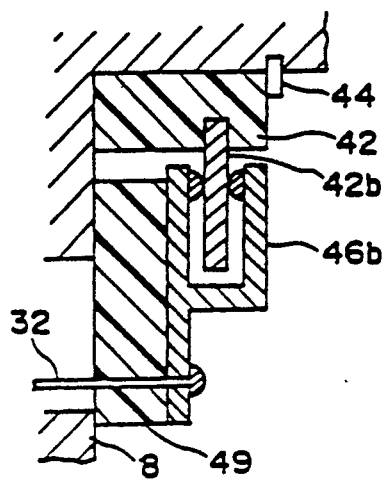

FIG. 2 is a sectional view illustrating the state of engagement between the fixed contact 46b and the movable contact 42b forming the changeover switch for the V-phase. Each fixed contact has a cross-sectional configuration of this kind and is adapted to clamp the corresponding movable contact with a predetermined pressure. The portions where the fixed contact abut against the movable contact are hemispherical in shape and therefore make and break contact smoothly.

With reference again to FIG. 4, fixed contacts 45b and 45a; fixed contacts 46b and 46a; and fixed contacts 47a and 47a are rendered conductive via their respective movable contacts when the solenoid 40 is deenergized, and the fixed contacts 45b and 45c; fixed contacts 46b and 46c; fixed contacts 47b and 47c; and fixed contacts 48a and 48b are rendered conductive via their respective movable contacts when the solenoid 40 is deenergized.

Figure 4:
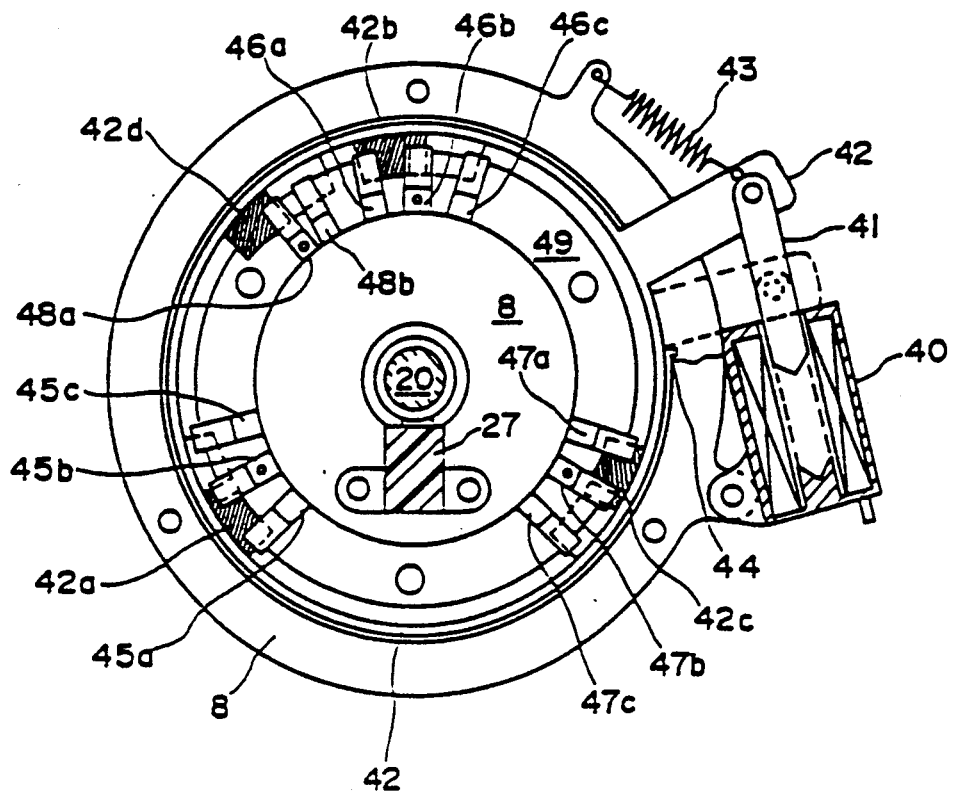

The fixed contacts 45a, 45c, 46a, 47a, and 47c are connected to a commutating/energizing control unit 5 (not shown in FIG. 4).

The commutating/energizing control unit 5 comprises three hybrid IC's 51, 52 and 53 each having a C-MOSFET and a diode.

Figure 3:
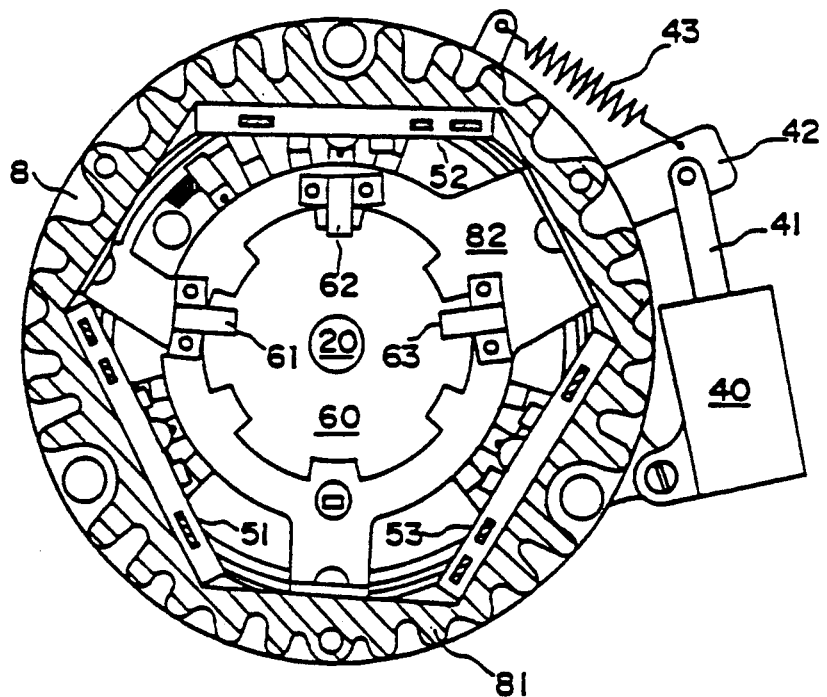

FIG. 3 is a sectional view taken along line I—I of FIG. 1. As shown in FIG. 3, the hybrid IC's are arranged on a rear bracket 81 near respective ones of the U-, V- and W-phase changeover switches. The rear bracket 81 is secured to the housing 8 and has a number of heat radiating fins formed on its outer periphery.

A timing setting unit comprises a slitted plate 60 secured to the rotary shaft 20 of the rotor 2, and three photosensors 61, 62 63 serving as rotational position detecting means for detecting a slit formed in the slitted plate 60. As shown in FIG. 3, the photosensors 61, 62, 63 are disposed on a sensor bracket 82 secured to the rear bracket 81.

The photosensors 61, 62 63 and hybrid IC's 51, 52 and 53 are connected via a printed circuit board 71.

Figure 5:
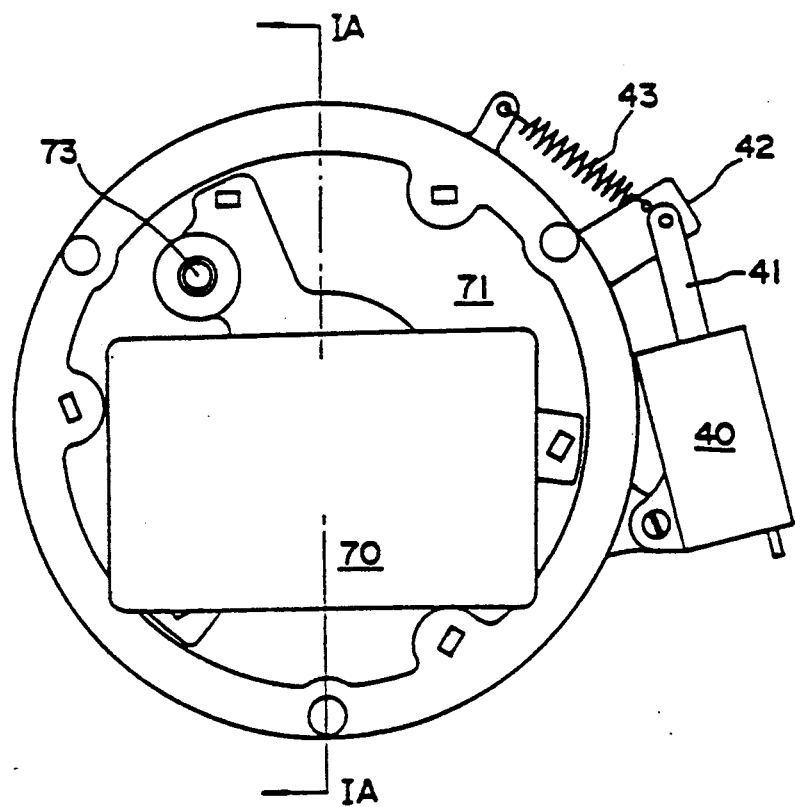

FIG. 5 is a right-side view of FIG. 1, and hence FIG. 1 is a sectional view taken along line IA—IA of FIG. 5. The printed circuit board 71 is urged by a conductor ring 74 forming common ground and is fixedly screwed onto the rear bracket 81. A control circuit 70 is formed on the printed circuit board 71. A common positive electrode 72 formed on the printed circuit board 71 is equipped with a power supply input/output terminal 73 to which the anode terminal of a battery BT (FIG. 6) is connected.

The electrical construction of the apparatus embodying the present invention will now be described with reference to FIG. 6.

As shown in FIG. 6, diodes D1a, D1b, an inverter INV1, a Zener diode ZD1, a C-MOSFET Tr1 and a by-pass diode connected thereto are formed as the hybrid IC 51, diodes D2a, D2b, an inverter INV2, a Zener diode ZD2, a C-MOSFET Tr2 and a by-pass diode connected thereto are formed as the hybrid IC 52, and diodes D3a, D3b, an inverter INV3, a Zener diode ZD3, a C-MOSFET Tr3 and a by-pass diode connected thereto are formed as the hybrid IC 53.

The diodes D1a, D1b, D2a, D2b, D3a and D3b construct a three-phase AC full-wave rectifier circuit for charging the battery BT. The cathodes of the diodes D1a, D2a and D3a are connected to the anode of the battery BT, and the anodes of the diodes D1b, D2b and D3b are connected to the cathodes of the battery BT through a common ground 74.

The three-phase AC outputs U, V, W of the generator apparatus exhibit a rated frequency and are led out to the exterior of the apparatus at a terminal T1 to be connected to a load. The C-MOSFET's Tr1, Tr2, Tr3 act as switching elements for controlling the energization of the U-, V- and W-phase coils, respectively.

A photosensor 61 and the inverter INV1 construct switching means for deciding the conduction time of the C-MOSFET Tr1, a photosensor 62 and the inverter INV2 construct switching means for deciding the conduction time of the C-MOSFET Tr2, and a photosensor 63 and the inverter INV3 construct switching means for deciding the conduction time of the C-MOSFET Tr3.

The Zener diodes ZD1, ZD2 and ZD3 function as input limiters of the corresponding FET's. These operate as inverter devices in the motor mode.

In the control circuit 71 of the motor mode, DC power supplied by a battery power supply P1 via a key switch SW and a regulator IC6 is used as a common power supply P2.

The output of an F/V converter IC1 which receives the output signal of the photosensor 62 as an input is connected to an inverting terminal of a positive-feedback amplifier serving as a first comparator CMP1. Connected to the non-inverting terminal of the comparator is a reference voltage which corresponds to a rotational speed of 1000 rpm. The output of the comparator CMP1 is connected to the base of a transistor Tr8 whose collector is connected to the solenoid 40 and to one terminal of a relay RL2 in the changeover unit 4. The solenoid 40 and the other terminal of the relay RL2 are connected to the battery power supply P1 via an ignition switch IGSW. The emitter of the transistor Tr8 is grounded. The output of the F/V converter IC1 is further connected to the non-inverting terminal of a positive-feedback amplifier serving as a second comparator CMP2. Connected to the inverting terminal of the second comparator is a reference voltage which corresponds to a rotational speed of 6000 rpm. The output of the second comparator CMP2 is one input of an AND gate IC3.

The output of a water temperature sensor adapted to serve as the engine temperature sensing element is directed through an amplifier IC2 and enters the inverting terminal of a positive-feedback amplifier serving as a third comparator CMP3. Connected to the non-inverting input terminal of this comparator is a reference voltage corresponding to a cooling water temperature of 70° C.

The output of the third comparator CMP3 is the base input of a transistor Tr9 whose emitter output is the input to an inverter INV5. The collector of the transistor Tr9 is connected to the power supply P2. The output of the inverter INV5 is the other input to the AND gate IC3. The output of the AND gate IC3 is the control input of a PNP transistor Tr10, whose emitter is connected to the power supply P2 via a resistor R5 and to one terminal of a capacitor C1, the other terminal of which is connected to ground. The collector of the transistor Tr10 is grounded.

The output of the PNP transistor Tr10 connected to the capacitor C1 enters the base of a power transistor Tr12 via a first analog switch IC4. The power transistor Tr12 has a collector connected to the power supply P2 and an emitter connected to the rotor coil 23 via the flange 25a. The other terminal of the rotor coil 23 is connected to ground via the brush 25b.

The inverting terminal of an operational amplifier serving as a fourth comparator CMP4 is connected to the emitter output of the PNP transistor Tr10. Connected to the non-inverting input terminal of this comparator is a reference voltage formed by resistors R11 and R12. The output of the fourth comparator CMP4 is used as the control input of the analog switch IC4 and forms the input of an inverter INV6, the output whereof forms the control input of a second analog switch IC5.

The reference voltage formed by the resistors R11, R12 enters the inverting terminal of a first negative-feedback amplifier OP1. The value of this reference voltage is compared with the value of a voltage, which is formed by resistors R8, R9 and applied to the non-inverting terminal of the first negative-feedback amplifier OP1, proportional to the voltage of the battery power supply P1 corresponding to the present output voltage value of the generator apparatus. The output of the first negative-feedback amplifier OP1 enters the base of the power transistor Tr12 through the second analog switch IC5. Also applied to the base of this transistor is the output of the first analog switch IC4.

The coil of a relay RL1 is separately connected to the emitter side of the transistor Tr9 connected to the output side of the third comparator OMP3, and the other end of this coil is grounded. A reference voltage corresponding to 2000 rpm and a reference voltage corresponding to 6000 rpm are set by a variable resistor VR1 and are connected to an a contact terminal r15 and a b contact terminal r14 of the relay, respectively. A single terminal r16 common to these two contacts is connected to a non-inverting terminal of a fifth comparator CMP5. The output signal of the F/V converter is connected to the inverting terminal of the comparator CMP5. Connected to the output side of this comparator is a throttle controller K. This is a control unit for reversibly controlling a throttle valve motor M.

Though the AC output and DC output are externally extracted via terminals T1, T2, terminals (not shown) for an extension starter switch and instrumentation are separately provided to make possible start-up at a remote location.

Figure 7:
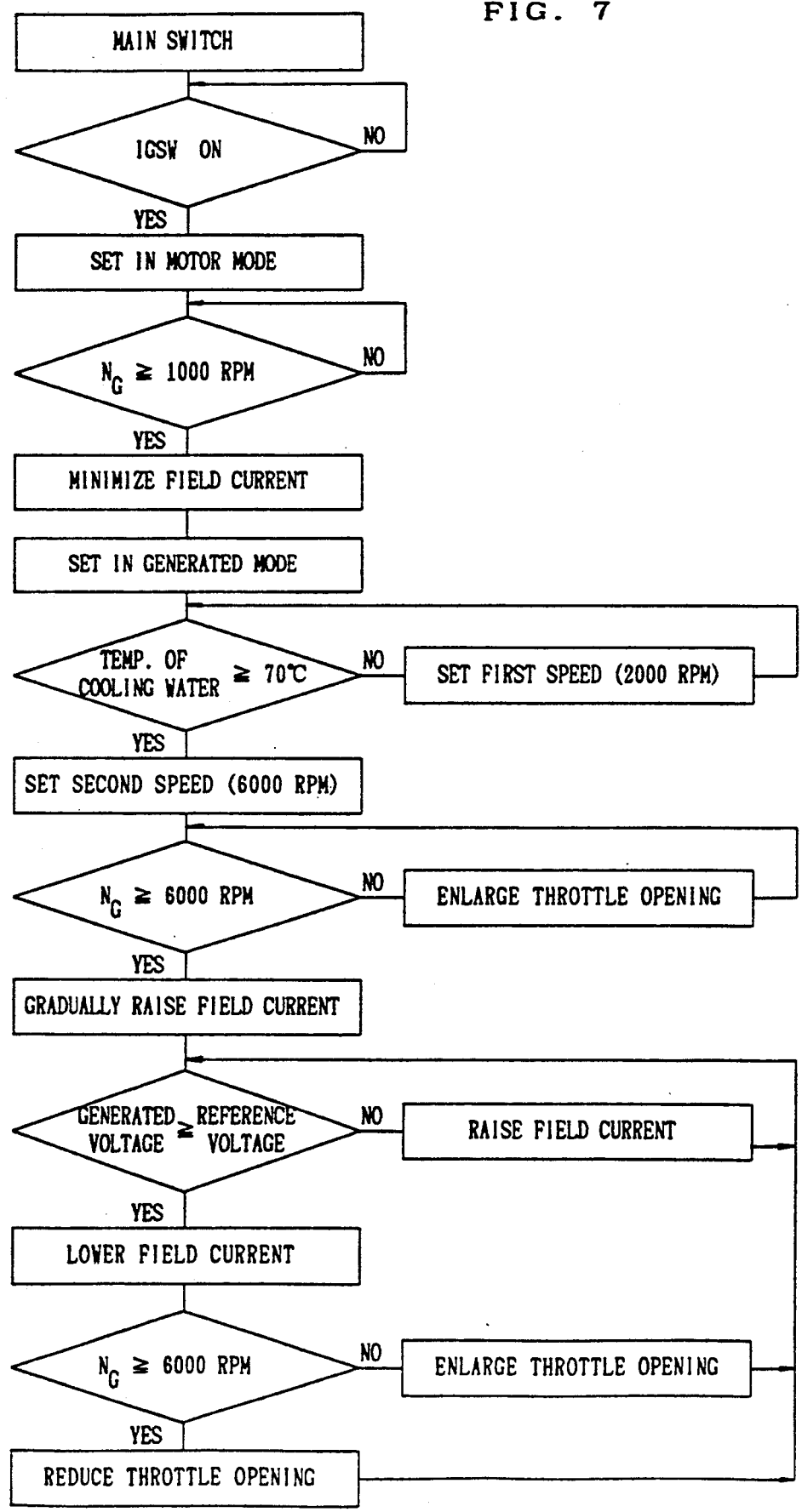

The operation of the generator apparatus according to this embodiment will now be described. A flowchart of the operation of this apparatus is illustrated in FIG. 7. A computerized control by a program corresponding to the flowchart of FIG. 7 is also possible.

The output of the photosensor 62 is converted into a voltage proportional to the rotational speed by the F/V converter IC1. This output is compared with the voltage value corresponding to 1000 rpm by the first comparator CMP1. The transistor Tr8 is turned on when the rotational speed is less than 1000 rpm. In response to closure of the key switch IGSW, which in effect produces a start signal, the solenoid 40 connected to the transistor Tr8 is energized to switch the changeover unit 4 to the motor mode, as a result of which the generator apparatus is started. Since the relay RL2 is also energized at this time, contacts r17 and r18 are rendered conductive so that the rotor coil 23 is energized by the battery voltage. As a result, the required magnetic field is produced. The C-MOSFET's Tr1, Tr2, Tr3 are rendered conductive successively in accordance with the position of the rotor sensed by the photosensors 61, 62, 63, so that the apparatus proper is rotated as a known transistor motor.

When the rotational speed reaches 1000 rpm, the two inputs to the first comparator CMP1 become equal, so that the comparator output becomes "0" and transistor Tr8 is rendered non-conductive. As a result, the solenoid 40 and relay RL2 are deenergized, so that the changeover unit 4 is switched over to the generator mode and contacts r17, r18 are opened. In the ordinary case, the engine starts by this time, so that the rotational speed of the apparatus gradually rises and attains the first set rotational speed 2000 rpm. Since the engine temperature is still less than 70° C. and relay RL1 is energized via the transistor Tr9 at this time, terminals r15 and r16 are closed. Accordingly, the fifth comparator CMP5 compares the output of the F/V converter IC1 and the voltage value of the variable resistor VR1 corresponding to the rotational speed 2000 rpm. On the basis of the output from the comparator CMP5, the opening of the throttle valve is regulated so as to make the error between the two compared signals zero. As a consequence, the rotational speed of the generator apparatus is maintained at 2000 rpm. Under these conditions, idling is performed, engine temperature rises and, hence, so does the cooling water temperature.

When the temperature sensed by the cooling water temperature sensor reaches 70° C., the transistor Tr9 controlled by the output of the third comparator CMP3 becomes non-conductive and relay RL1 is deenergized. Consequently, the relay terminals r16, r14 are closed, whereby the rotational speed of the engine set by the variable resistor VR1 and inputted to the negative-feedback amplifier attains a value of 6000 rpm. The throttle valve opening is regulated accordingly until the engine rotational speed rises to 6000 rpm. Thereafter, the speed of 6000 rpm is maintained by regulating the opening of the throttle valve.

The field current of the rotor is zero as a result of opening the terminals r17, r18 at the same time that the changeover is made to the generator mode. This state of zero field current is maintained at rotational speeds of less than 6000 rpm.

Figure 8:
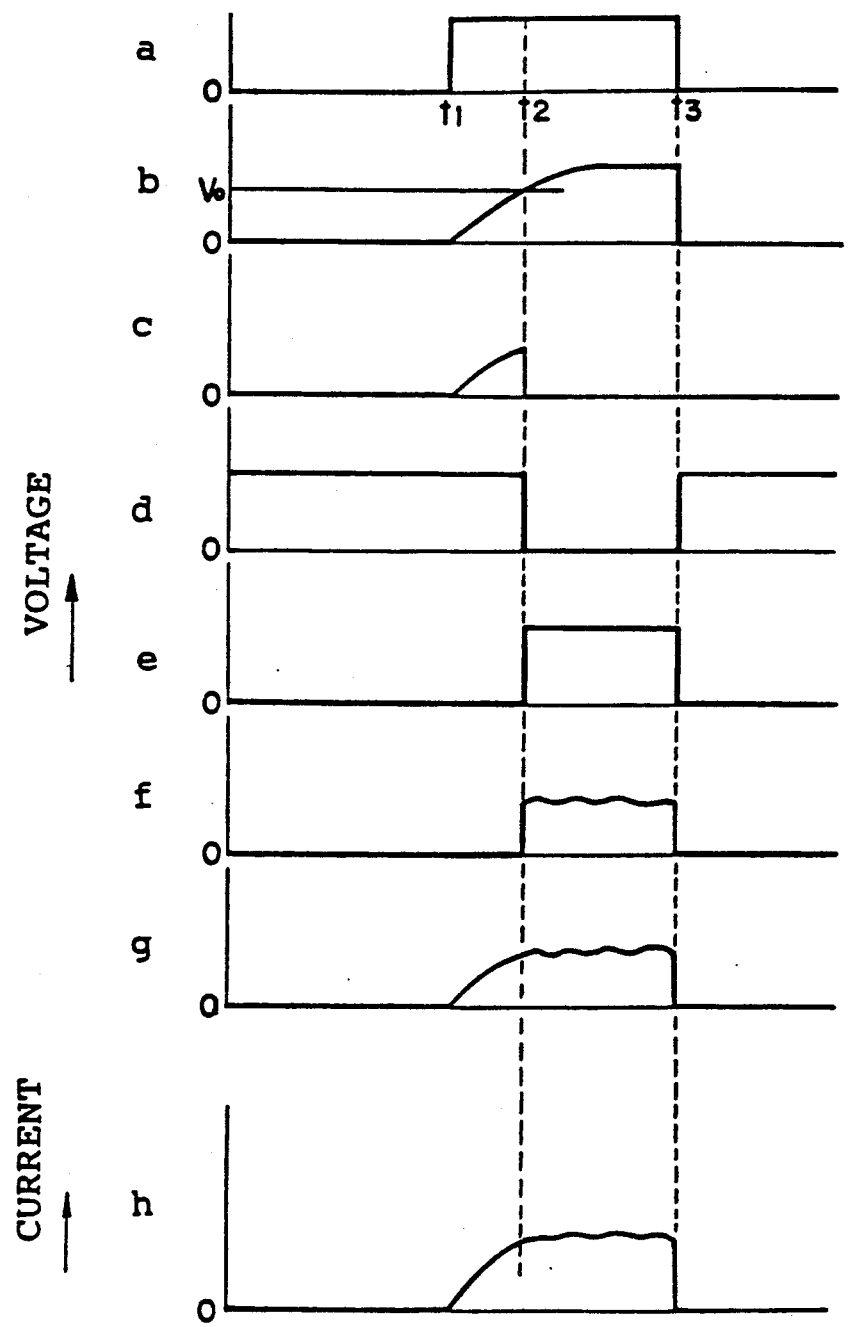
FIG. 8 is a signal waveform diagram showing signals associated with the various points in the circuit of FIG. 6.
Figure 9:
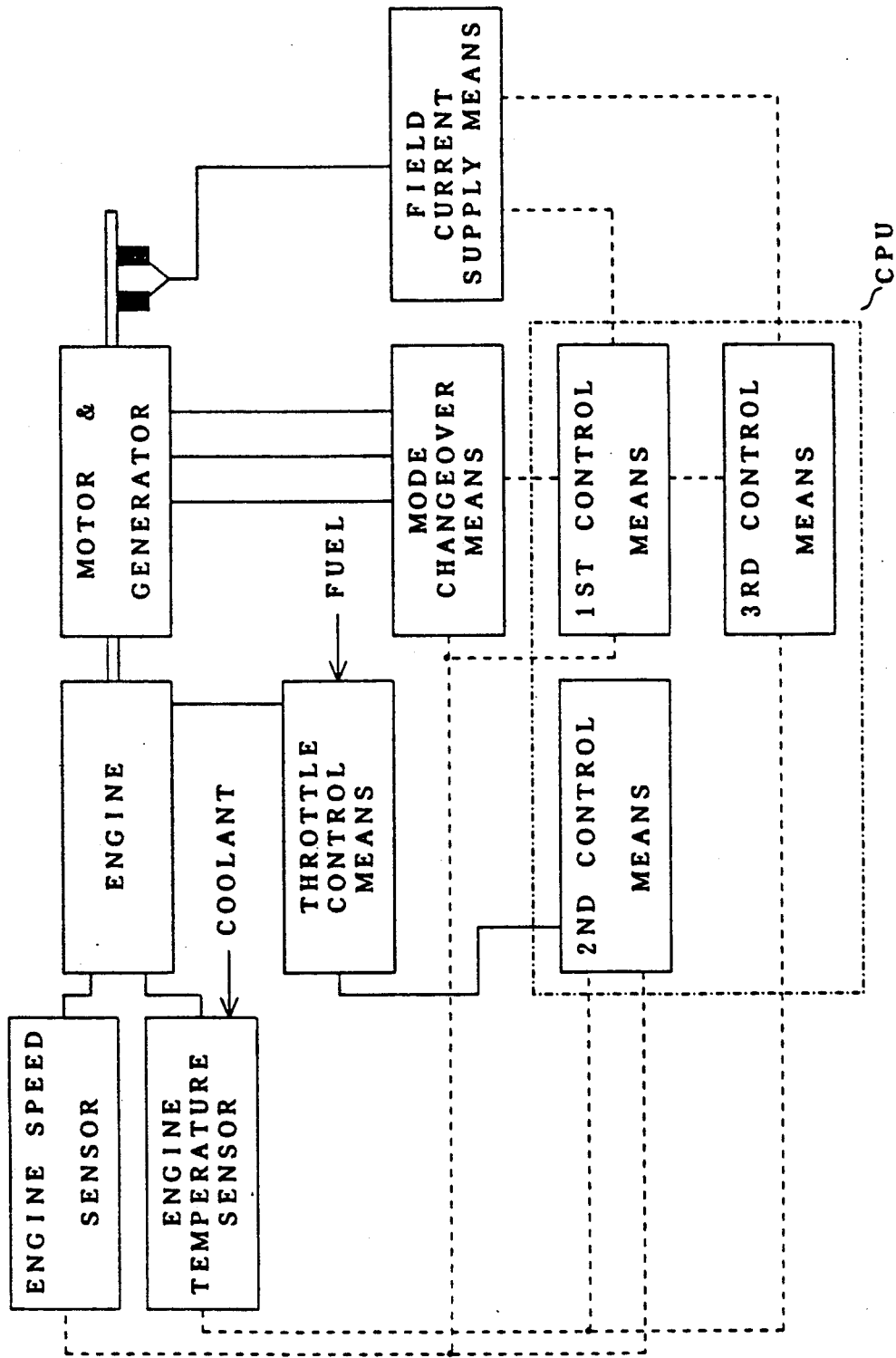
FIG. 9 is a block diagram illustrating an embodiment of an engine generator apparatus and generator/starter apparatus.
Figure 10:
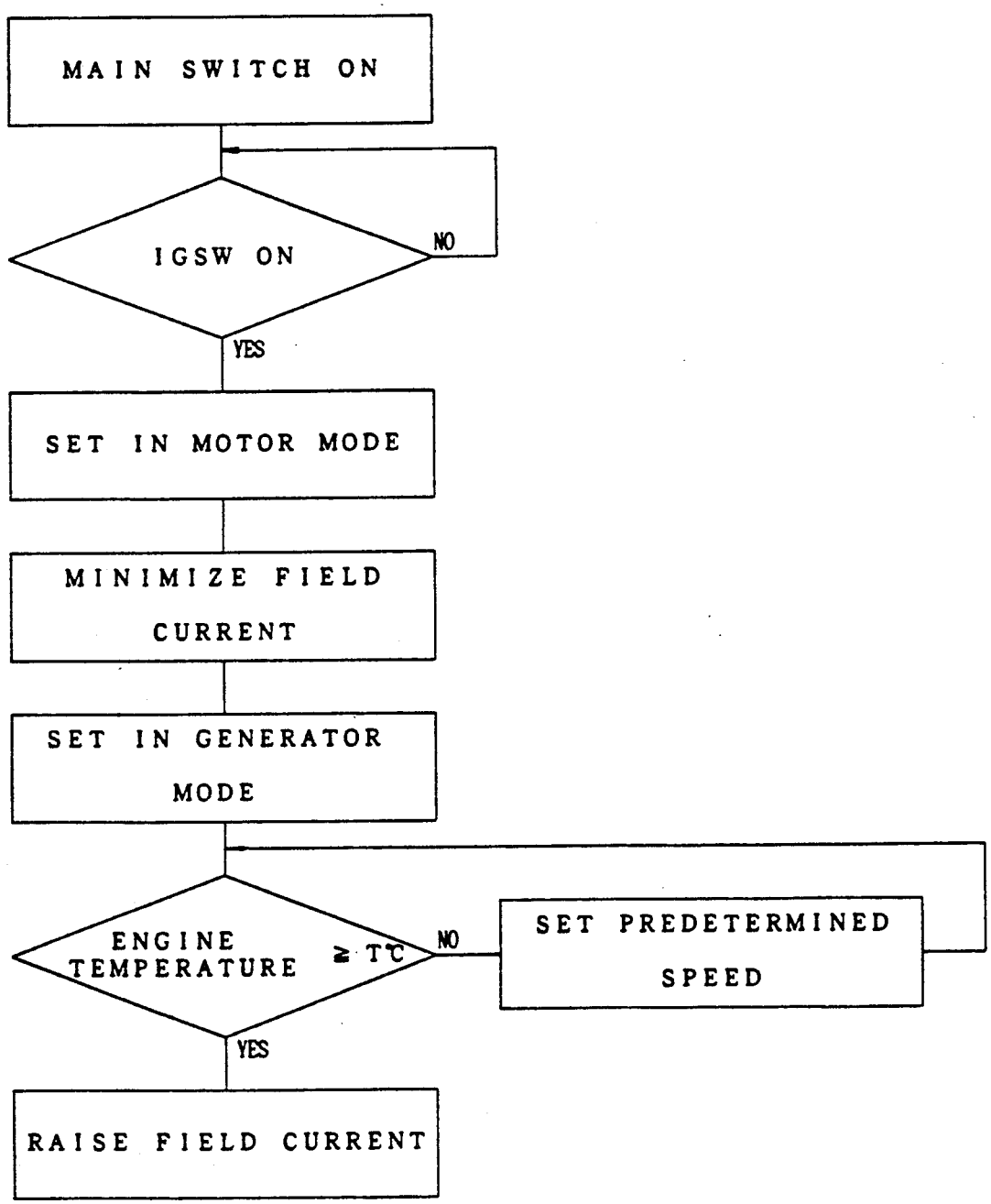
FIG. 10 is a flowchart showing the concept of operation of the generator apparatus of the present invention.

When the output of the F/V converter IC1 exceeds a value corresponding to 6000 rpm, the output of the second comparator CMP2 becomes "1". Since the output of the water temperature sensor is already 70° C. or a higher, the transistor Tr9 is non-conductive, and hence, the output of the inverter INV5 is "1". Consequently, both inputs to the AND gate IC3 are "1". The outputs of the various circuit components at this time are as shown in FIG. 8. When the output (a) of the AND gate IC3 becomes "1" at time $t_1$, the PNP transistor Tr10 is rendered non-conductive and the capacitor C1 is gradually charged. The terminal voltage (b) of the capacitor C1 therefore rises in gradual fashion. This voltage is compared with the reference voltage value by the fourth comparator CMP4. The output (d) of the fourth comparator CMP4 is "1", and hence the analog switch IC4 is conducting, while this terminal voltage (b) is lower than the reference voltage value. As a result, the base voltage (g) of the power transistor Tr12 slowly rises. In consequence, the field current (h) which flows into the rotor coil 23 also slowly rises. When the terminal voltage (b) of the capacitor C1 rises above the reference voltage $v_0$ at time $t_2$ m the output of the fourth comparator CMP4 becomes "0" and the first analog switch IC4 is rendered non-conductive.

When the output (d) of the fourth comparator CMP4 becomes "0" the output (e) of the inverter INV6 becomes "1"; hence, the second analog switch IC5 is rendered conductive. The detected voltage proportional to the output voltage value of the generator, and which is outputted upon voltage division by the resistors R8, R9 connected to the positive electrode P1 of the battery BT, becomes the non-inverted input of the first negative-feedback amplifier and is compared with the reference voltage value formed by the resistors R11, R12, the reference voltage being the inverted input of the same amplifier.

The output value (f) of this amplifier operates as the base input (g) of the power transistor Tr12 through the second analog switch IC5. It should be noted that the resistors R8, R9 are adjusted at the time of shipping in such a manner that a predetermined field current will flow when the output voltage value of the generator coincides with the set voltage value. As a result, after a stable state is attained following start-up, field current adjustment based on the output value of the second analog switch IC5 is performed and the field current is adjusted in such a manner that the output voltage value of the generator will coincide with the set voltage value. When the generator receives a stop signal at time $t_3$ and stops, the output of the F/V converter IC1 drops, as a result of which the output (a) of the AND gate IC3 becomes "0" and the transistor Tr10 is rendered conductive. In consequence, the terminal voltage (b) of the capacitor C1 becomes "1".

Accordingly, the output (d) of the fourth comparator becomes "1", the first analog switch IC4 is rendered conductive again and the second analog switch is rendered non-conductive. However, since the output signal (c) of the first analog switch is "0" as before, the output current (h) of the power transistor Tr12 and, hence, the field current that flows into the rotor coil 23, both become zero.

As a result of this operation, the field current flows into the rotor coil 23 for the first time at $t_1$ after the changeover to the generator, as described above. This rising curve abides by the rising waveform of the terminal voltage of capacitor C1, namely the time constant $\tau$ of R5 and C1. At time $t_2$, which is the time at which the rated field current flows, the generator finally generates the rated voltage, which is displayed on a meter, not shown. As a result, the operator is informed of the fact that an AC or DC load can be applied, this being possible since the generator is generating the rated voltage of the rated frequency. If the rotational speed of the engine rises for some reason while running under the rated conditions, the output of the first negative-feedback amplifier OP1 will increase to raise the base voltage of the power transistor, as a result of which the field current of the rotor coil will increase. This causes an increase in the generator output and an increase engine load. The rise in rotational speed therefore is suppressed. Accordingly, adjustment of engine speed is carried out by two means, namely means for adjusting throttle valve opening and means for regulating field current. The latter involves a small time constant and makes quick response possible.

In the present embodiment, the changeover between the generator mode and the motor mode employs the changeover unit 4, which utilizes the solenoid 40. However, the invention is not limited to this arrangement, for an ordinary relay or the like can be used.

Though detection of engine temperature is performed by a coolant water temperature sensor, the temperature of the engine body can be measured in a case where the engine is air-cooled.

The rotational speed sensor can be a well-known magnetoelectric element.

Further, in the present embodiment, the apparatus is composed of discrete circuitry. However, the apparatus is not limited to such an arrangement, for it is possible to replace the generator control circuitry 70 by a microcomputer which is programmed according to the flowchart e.g., shown in FIG. 7. Utilizing a microcomputer makes possible not only more effective use of space but also finer control.

Though the present embodiment is described as being a portable-type engine generator apparatus, the foregoing will hold true for a starter/generator coupled directly to an automotive vehicle.

It should be noted that the present invention can be modified in various ways within limits which include the gist of the invention, and that all modifications which would be evident to one skilled in the art from the following claims are covered by the scope of the invention.

What is claimed is:

1. An engine generator apparatus having a motor/generator operated in a motor mode for starting an engine and in a generator mode to be driven by the engine, comprising:

first control means for minimizing field current when a changeover is made from the motor mode to the generator mode;

second control means operable in the generator mode for maintaining rotational speed of the engine at a first set rotational speed until engine temperature attains a set temperature, and for outputting a signal, which increases the rotational speed of the engine to a second set rotational speed, to throttle-adjusting means after the engine temperature attains said set temperature; and third control means for increasing the field current of the motor/generator from the minimum state after the engine temperature attains said set temperature.

2. The apparatus according to claim 1, wherein said third control means increases the field current after the rotational speed of the engine attains said second set rotational speed.

3. The apparatus according to claim 1, wherein temperature of engine coolant is used as the engine temperature.

4. The apparatus according to claim 1, wherein after the motor/generator is supplied with the field current in the generator mode, the field current is regulated by a signal indicative of output voltage and adjustment of throttle opening is performed based on a signal indicating the rotational speed of the engine.

5. The apparatus according to claim 1, further comprising external terminals for a remote starter switch and a voltmeter for output voltage.

6. The apparatus according to claim 1, wherein changeover from the motor mode to the generator mode is performed by mode changeover means comprising:

a solenoid;

a disk driven by said solenoid;

a movable contact held by said disk; and a set of fixed contacts for being engaged and disengaged by said movable contact.

7. The apparatus according to claim 1, wherein said first through third control means comprise a programmed computer.

8. The apparatus according to claim 1, wherein said engine generator apparatus is portable.

9. A generator/starter apparatus having a motor/generator operated in a motor mode for starting an engine and in a generator mode to be driven by the engine, comprising:

first control means for minimizing field current when a changeover is made from the motor mode to the generator mode;

second control means operable in the generator mode for outputting, to throttle adjusting means, a signal for maintaining rotational speed of the engine at a first set rotational speed until engine temperature attains a set temperature, and for increasing the rotational speed of the engine to a second set rotational speed after the engine temperature attains the set temperature; and third control means for increasing the field current of the motor/generator from the minimum state after the engine temperature attains said set temperature.

10. The apparatus according to claim 9, wherein said third control means increases the field current after the rotational speed of the engine attains said second set rotational speed.

11. The apparatus according to claim 9, wherein temperature of engine coolant is used as the engine temperature.

12. The apparatus according to claim 9, wherein after the motor/generator is supplied with the field current in the generator mode, the field current is regulated by a signal indicative of output voltage and a throttle opening adjustment signal is outputted based on a signal indicating the rotational speed of the engine.

13. The apparatus according to claim 9, wherein changeover from the motor mode to the generator mode is performed by mode changeover means comprising:

a solenoid;

a disk driven by said solenoid;

a movable contact held by said disk; and a set of fixed contacts for being engaged and disengaged by said movable contact.

14. The apparatus according to claim 9, wherein said first through third control means comprise a programmed computer.

15. The apparatus according to claim 9, wherein said generator/starter apparatus is a generator/starter apparatus for an automotive vehicle.

16. A method of operating a generator/starter apparatus having a motor/generator operated in a motor mode for starting an engine in a generator mode to a driven by the engine, comprising:

a first step of effecting a changeover from the motor mode to the generator mode while minimizing field current;

a second step of outputting a signal for maintaining rotational speed of the engine at a predetermined set rotational speed until engine temperature attains a set temperature, and a third step of increasing the field current of the motor/generator from the minimum state after the engine temperature attains said set temperature.

17. The method according to claim 16, wherein a step of increasing the rotational speed of the engine to a second set rotational speed after the engine temperature attains said set temperature is included ahead of said third step.

18. The method according to claim 16, wherein temperature of engine coolant is used as the engine temperature.

19. The method according to claim 16, wherein a step of adjusting field current by a signal indicative of output voltage and outputting a throttle opening adjustment signal based on the rotational speed of the motor/generator is included after said third step.

20. The method according to claim 16, wherein said first through third steps are effected by a programmed computer comprising the following steps:

(a) comparing the rotational speed of the engine whether it is equal to or greater than a predetermined minimum rotational speed, (b) if NO at step (a), outputting a signal indicative of the motor mode, (c) if YES at step (a), outputting a signal minimizing the field current, (d) comparing a signal indicative of the rotational speed of the engine whether it is equal to or greater than a first set rotational speed, (e) if NO at step (d), outputting a signal indicative of setting the first set rotational speed, (f) if YES at step (d), outputting a signal indicative of setting a second set rotational speed which is higher than the first set rotational speed.

* * * * *